Figure 1:
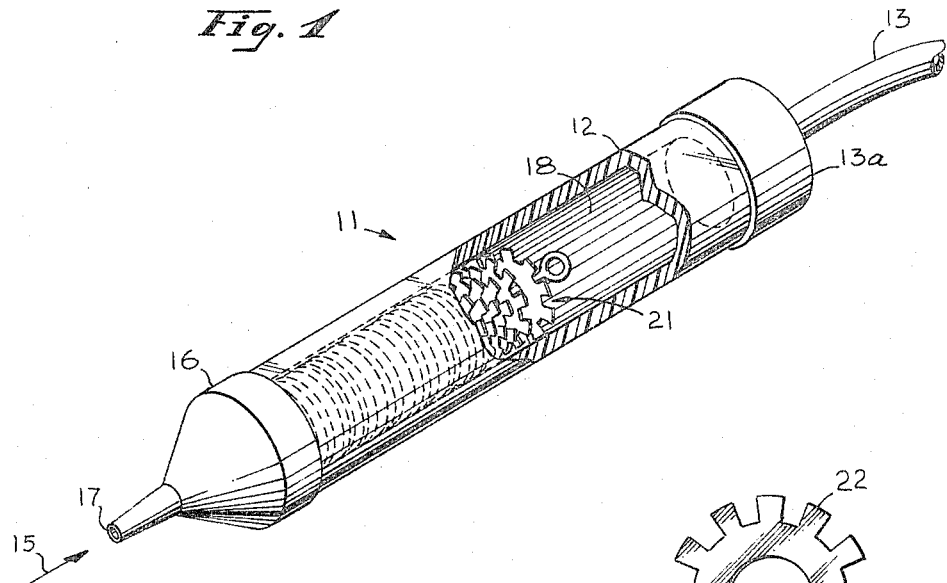

Dec. 6, 1966 J. E. PRINCIOTTA, JR 3,289,399
VACUUM OPERATED SOLDER REMOVING FILTER
Filed Nov. 5, 1963

JOSEF E. PRINCIOTTA, JR
INVENTOR.

BY Allen M. Sutton
ATTORNEY

United States Patent Office 3,289,399
Patented Dec. 6, 1966

3,289,399
VACUUM OPERATED SOLDER REMOVING FILTER
Josef E. Princiotta, Jr., North Hollywood, Los Angeles, Calif., assignor to The Bunker-Ramo Corporation, Stamford, Conn., a corporation of Delaware
Filed Nov. 5, 1963, Ser. No. 321,632
2 Claims. (Cl. 55—445)

This invention relates to vacuum operated solder removing tools and, more particularly, to a novel filter adapted to be incorporated in vacuum operated solder removing equipment.

The use of solder for joining electrical components which make up various circuits is so wide spread that many devices and tools have been invented to simplify and improve the techniques of soldering. Soldering irons and soldering guns are but two examples of such helpful devices.

Similarly, solder removing tools have been developed to aid in reworking and repairing soldered assemblies of components in the circuit which may be sensitive to excesplace one or more components without damaging other components in the circuit which may be sensitive to excessive heat generated during the resoldering process. The solder removing tools, which are also known as desoldering tools, aid in reducing the amount of heating produced during unsoldering by removing or sucking in the solder as soon as it becomes molten due to heat applied thereto. Thus, a minimum amount of heating is necessary to separate soldered components, substantially all of the heat being retained near the end terminals of the components to be separated, rather than radiating through the components themselves.

Solder removing tools are also often used in removing loose particles which are inevitably present in assemblies where solder is used to join the components therein. This is especially true when multi-component assemblies or chassis are reworked to unsolder and replace defective components with new components which are then soldered in their places. The loose solder particles are formed when small quantities of molten solder which somehow are not removed during the desoldering operation solidify and drop into the chassis, and unless they are removed, they may cause shorts and circuit malfunctioning. Some of these solder removing tools are vacuum operated, so that molten solder or loose solder particles are sucked in the tool with the molten solder usually solidifying into particles upon being sucked into the tool. Although the performance of such devices is generally quite satisfactory, yet they require substantial maintenance and cleaning to remove the solder particles which are sucked into the tools or formed therein so as to prevent the particles from interfering with the vacuum and reducing the suction in the tools.

It is therefore an object of the present invention to provide an assembly which will prevent solder particles from interfering with and reducing the vacuum created in vacuum operated solder removing tools.

It is a further object of the present invention to provide an inexpensive filter to trap solder sucked into a vacuum operated solder removing tool and prevent it from clogging the vacuum-creating portion thereof.

It is another object of the present invention ot provide a filter which can be conveniently incorporated in an existing vacuum operated solder removing tool and which is conveniently removable therefrom for cleaning purposes.

Figure 3:
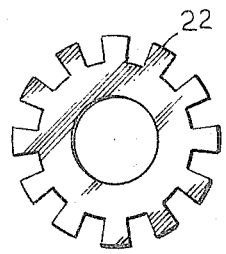
Figure 2:
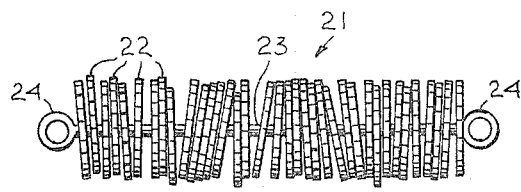

Other objects and a fuller understanding of this invention may be had by referring to the following description, taken in conjunction with the accompanying drawings, in which:

FIGURE 1 is a perspective view, with a portion broken away, of a solder removing tool embodying the invention;
FIG. 2 is an elevational view of a filter constructed in accordange with the invention; and
FIG. 3 is a plan view of an element of the filter of the present invention.

Referring to FIG. 1, there is shown a vacuum operated solder removing tool 11 which comprises a hollow housing 12 removably connected at one end to a vacuum tube 13 by means of an end cup 13a into which the end of the housing fits. The other end of the tube 13 is connected to a vacuum source (not shown), such as a vacuum pump. The vacuum source creates, through the tube 13, a vacuum in the housing 12, so that air and loose particles of solid or molten solder may be sucked into the housing 12 through the other end thereof. The direction of flow into the housing is indicated by an arrow 15. The end of the housing 12 through which the material enters is preferably provided with a removable, funnel-shaped end cap 16 having a relatively small opening 17 therein, so that the suction provided by the tool can be accurately directed.

The housing 12 has a hollow cylindrical interior 18, which houses a filter indicated generally by the numeral 21. As seen in FIG. 2, the filter 21 comprises a plurality of elements 22 which are loosely strung on a shaft 23. The elements 22 may be held on the shaft 23 by loops 24 secured to the ends of the shaft. Each of the elements 22, besides having an opening therein to enable it to be strung on the shaft 23, is of a cross-section which is slightly smaller than the cross-section of the interior 18 of the housing 12 so that the filter 21 can conveniently be placed therein. Further, each element 22 may have a serrated periphery and be covered with a thin film of oil in order to improve its performance in trapping solder in moldten solid form and causing it to adhere thereto. In practice, it has been found that conventional lock washers serve quite effectively as the filter elements 22.

During operation of the tool, air including any loose solder particles or molten solder is sucked into the housing 11 as previously described. As the particles or molten solder pass the filter 21, they are trapped by the elements 22 and tend to adhere to them due to the oil film which covers them. The oil film aids in quickly cooling and solidifying any molten solder which is trapped by any of the elements 22.

From experience, it has been found that in the absence of the filter 21, some solder particles or molten solder sucked into the tool housing continue to pass from the housing 12 through the vacuum tube 13 into the vacuum pump or other vacuum producing device. As particles accumulate there, the amount of vaccum created is reduced, thus resulting in reducting tool efficiency and finally complete uselessness unless the entire equipment is often disassembled and cleaned.

However, with vacuum operated solder removing tools incorporating filters constructed in accordance with the invention, it has been found that substantially all solder particles or molten solder sucked into tools, such as the tool 11 (FIG. 1), adhere to the serrated and oiled elements of the filter and are prevented from passing to the vacuum producing pump or other device. This greatly increases the efficiency of the tools used and reduces the time required for tool cleaning, which can be conveniently accomplished by removing the filter from the housing, tapping it against a hard surface so as to loosen the trapped solder particles therefrom, and then replacing the filter in the housing for continued operation.

In one particular example, the filter 21 was constructed of elements such as the one shown in FIG. 3, which is a standard inexpensive serrated metal lock washer. The washers were strung on a shaft, oiled, and placed in an existing tool which had been previously used without such a filter. The filter provided greatly increased efficiency and a substantial reduction in the time required for cleaning the tool and removing the solder particles trapped therein.

Although in the foregoing description, the tool housing and its hollow interior are noted as being cylindrical, and the filter elements are described as having a serrated circular configuration, it is apparent that the invention is not limited thereto and that other configurations may be employed without departing from the invention. Similarly, the element shown in FIG. 3 was referred to as being a serrated metal lock washer; however, it is apparent that other materials, such, for example, as plastics, may be used to construct the plurality of elements which are incorporated in the filter.

Therefore, while the invention was described in connection with specific examples, it is to be understood that the invention is not limited thereto, as many variations will be readily apparent to those skilled in the art which fall within the true spirit and scope of the invention.

The embodiments of the invention in which an exclusive property or privilege is claimed are defined as follows:

1. A solder removing tool comprising:
   a cylindrical, circularly hollowed housing having an axis and two open ends;
   means connected to said housing at one of its open ends for creating a vacuum therein; and
   a filter positioned in said housing for trapping solder sucked into said housing through the other open end thereof, said filter comprising a shaft having its length substantially shorter than the length of said housing and disposed within said housing substantially parallel to said axis, and a plurality of serrated discs, each of said discs having an enlarged central opening through which said shaft extends that is of sufficiently greater diameter than the diameter of said shaft whereby said discs are loosely mounted thereon in an in-line relationship to permit rotatable and axial movement of said discs on said shaft, and means on the opposite ends of said shaft for restricting axial movement of said discs therebetween and for retaining said discs on said shaft, said serrated discs having planar cross-sectional areas substantially equal to but no greater than the cross-sectional area of the circular hollow portion of said housing.

2. The tool defined by claim 1 wherein said discs are covered with an oil film operable to weaken the adherence of the trapped solder to said discs whereby the trapped solder may be readily removed from said discs.

References Cited by the Examiner

UNITED STATES PATENTS

| | | | |
|---|---|---|---|
| 1,152,381 | 8/1915 | Kenney. | |
| 1,459,461 | 6/1923 | Austin | 55—442 X |
| 1,903,731 | 4/1933 | Gaston et al. | 55—445 X |
| 2,063,743 | 12/1936 | Kamrath | 55—524 |
| 2,162,550 | 6/1939 | Frankford | 55—446 |
| 2,232,913 | 2/1941 | Heuberger | 55—278 |
| 2,609,778 | 9/1952 | Bleam et al. | 15—409 X |
| 2,751,039 | 6/1956 | Hanly | 55—524 |

ROBERT F. BURNETT, *Primary Examiner.*

UNITED STATES PATENT OFFICE
CERTIFICATE OF CORRECTION

Patent No. 3,289,399                              December 6, 1966

Josef E. Princiotta, Jr.

It is certified that error appears in the above identified patent and that said Letters Patent are hereby corrected as shown below:

Column 1, line 22, cancel "components in the circuit which may be sensitive to exces-" and insert -- components. During such operations, it is desirable to --; line 23, "place" should read -- replace --; line 36, after "loose" insert -- solder --; line 64, "ot" should read -- to --. Column 2, line 36, "moldten" should read -- molten --; line 53, "reducting" should read -- reducing --.

Signed and sealed this 12th day of August 1969.

(SEAL)
Attest:

Edward M. Fletcher, Jr.                       WILLIAM E. SCHUYLER, JR.
Attesting Officer                                Commissioner of Patents